United States Patent [19]

Distler et al.

[11] Patent Number: 5,028,855
[45] Date of Patent: Jul. 2, 1991

[54] CONTROL PROCESS FOR A NUMERICALLY CONTROLLED MACHINE-TOOL OR FOR A ROBOT

[75] Inventors: Heinz Distler, Feucht; Norbert Armbruester, Erlangen, both of Fed. Rep. of Germany

[73] Assignee: Siemens Aktiengesellschaft, Berlin & Munich, Fed. Rep. of Germany

[21] Appl. No.: 485,384

[22] Filed: Feb. 26, 1990

[30] Foreign Application Priority Data

Feb. 28, 1989 [EP] European Pat. Off. ........ 89103535.4

[51] Int. Cl.$^5$ ............................................. G06F 15/46
[52] U.S. Cl. ................................. 318/568.13; 318/573; 318/574; 364/513; 364/474.29; 901/2
[58] Field of Search .................... 318/560–640; 364/513, 474.28–474.33; 901/2, 3, 4, 7, 9, 12, 13, 18–23

[56] References Cited

U.S. PATENT DOCUMENTS

| | | | |
|---|---|---|---|
| 4,528,632 | 7/1985 | Nio et al. | 318/574 X |
| 4,529,921 | 7/1985 | Moribe | 318/568.13 |
| 4,541,060 | 9/1985 | Kogawa | 318/573 X |
| 4,550,383 | 10/1985 | Sugimoto | 318/573 X |
| 4,648,024 | 3/1987 | Kato et al. | 364/474.29 |
| 4,705,999 | 11/1987 | Soji et al. | 364/513 X |
| 4,794,540 | 12/1988 | Gutman et al. | 364/474.29 |
| 4,835,710 | 5/1989 | Schnelle et al. | 364/513 |
| 4,858,140 | 8/1989 | Buhler et al. | 318/573 X |
| 4,887,222 | 12/1989 | Miyake et al. | 901/2 X |
| 4,903,213 | 2/1990 | Buhler et al. | 318/573 X |

*Primary Examiner*—Paul Ip
*Attorney, Agent, or Firm*—Kenyon & Kenyon

[57] ABSTRACT

A desired curved path is approximated by spline segments, which in their entirety define the path of motion for a machine-tool or for a robot. The deviation in position of this path of motion from the desired curved path is maintained within a specified tolerance band. Through an iterative process, the path of motion is formed with the fewest possible spline segments. If two many spline segments were used, they could overtax the processing speed of a numerical control system. But, on the other hand, the interpolation of spline segments is technically a relatively simple process.

20 Claims, 4 Drawing Sheets

CONTROL PROCESS FOR A NUMERICALLY CONTROLLED MACHINE-TOOL OR FOR A ROBOT

BACKGROUND OF THE INVENTION

The invention relates to a control process in general and more particularly to a control process for a numerically controlled machine-tool or for a robot.

A control process of this nature is used to determine points along a path which are connected by interpolated motion segments. Taken in their entirety, these motion segments approximate an ideal path of motion for the machine-tool or the robot within a specified tolerance with respect to the position. This ideal path of motion is divided into fine path segments using its point of origin as a first position and its target position as the last position. The characteristic parameters of all the positions on the ideal path of motion are stored and the point of origin is selected as the starting point of the first motion segment.

A process that accomplishes this task is disclosed in the German Published Patent Application 36 23 070. Using this method an ideal path of motion is converted into linear motion segments which can be easily processed by a control system. The end points of these linear motion segments, which meet to form discontinuities, are automatically determined. However, in many applications, these discontinuities that occur along the path of motion are undesirable. In order to protect the mechanisms of either the machine-tool or the robot and in order to obtain an improved surface quality, as well as to obtain a greater feed rate at the workpiece, it would be advantageous if the resulting path exhibited the smoothest possible curve.

A smooth curve can be produced by using a so-called spline method. With the help of a few interpolation points on the ideal path of motion, spline segments can thereby be formed, which, when connected together, yield an extremely smooth curve that approximates the resulting path of motion. For example, such a curve will result if the individual spline segments having the same slope and the same curvature are connected (Werkstatt and Bertribe "Workshop and Factory" 121 (1988) 9, page 737). The individual spline functions are calculated from defined interpolation points or linear sets using standard mathematical methods, such as the method of the natural spline, for example. Examples of this method are found in: "M. Keppeler: Generating Reference Input Variables for Numerically Path-Controlled Industrial Robots, Chapter 2.4.3".

The more complex the paths of motion that are to be travelled and the higher the quality of the results demanded, the shorter the individual spline segments must become. As a result, very large quantities of data are created which need to be processed on-line in the numerical control system. However, large quantities of data necessitate reducing the processing rate of data during execution of the program. This is in conflict with economic and technological requirements, unless hardware is used which is more efficient and is thus also more expensive.

In view of the prior art, there is a need to develop a control process of the type mentioned in the beginning, so that, with the least possible number of spline segments, the ideal path of motion can be approximated while at the same time ensuring that the resulting path of motion only deviates from the ideal path of motion by some maximum limiting value.

SUMMARY OF THE INVENTION

According to the present invention, this task is accomplished by the following process steps;
(a) The parameters of a spline are determined for a first, relatively short motion segment on the ideal path of motion; this segment ends at a position on the ideal path of motion which is used as a provisional end point and the characteristic parameters of at least the starting point and the provisional end point of the motion segment are used in determining the parameters of the spline.
(b) The distance from the spline to the ideal path of motion is determined for those positions lying between the starting point and the provisional end point.
(c) Provided that this distance does not exceed a defined limiting value, the provisional end point is advanced toward the target position, and the above sequence is repeated.
(d) As soon as the limiting value is reached or exceeded, the spline preceding the spline in question is taken as the first path segment.
(e) Using a position on the previously accepted spline as a starting position for a new motion segment, the process is repeated according to the preceding steps until the target position is reached.

A tolerance band, which defines the maximum allowable deviation with respect to the position of the ideal path of motion, is placed around the ideal path of motion, and the individual spline segments are calculated iteratively as long as they do not extend beyond this tolerance band. Thus, the breadth of the tolerance band influences the number of spline segments that are needed; the wider the tolerance band the fewer spline segments that are required to approximate the ideal path of motion.

A first advantageous aspect of the invention is that the limiting value of the deviation in position between the ideal path of motion and the spline segments is determined by both the vector sum of each of the deviations that occur in the directions of the coordinate axes as well as the form in which the general tolerance criterion is assigned. This tolerance criterion is to be assigned as a tolerance band which does not vary in thickness. If rotating axes are used, an inverse transformation from the machine coordinates into the workpiece coordinates is then required.

However, it is also possible for the limiting value of the deviation to be preselected along each of the coordinate axes. In this way, it can be determined if the positions of the spline segments along each of the individual axes are adhering to the specified tolerance. These tolerances can be given in units of length as well as angular units.

It is assumed that the concept of a "spline" can be used for both a natural curve as well as a curved path and that it can be described by a polynomial. Accordingly, a further advantageous aspect of the invention is that the values of four positions on the curve are used as the characteristic quantities for the corresponding spline. These four values are used to specify a third-degree polynomial. It is precisely because a third-degree polynomial is used that spline segments with different slopes and curvatures can be easily connected through smooth transitions. This polynomial can be determined by the so-called Newton method ("Bartsch-/Mathematical Formulae" Buch and Zeit Publishing House, Cologne, 1968, page 107).

If the spline segments are each determined by the position and slope of the respective spline ends, then the standard spline method mentioned above is used to generate the spline.

The parameterization of the path of motion is advantageously accomplished with respect to the travelled path length. This ensures that any ambiguities (different y-values assigned to one x-value) that might exist are avoided. Such ambiguities might occur, for example, in the case of a spiral path which is defined in a cartesian coordinate system. In this example, the x- and y-values should be specified as a function of the path length s.

DETAILED DESCRIPTION

Figure 1:
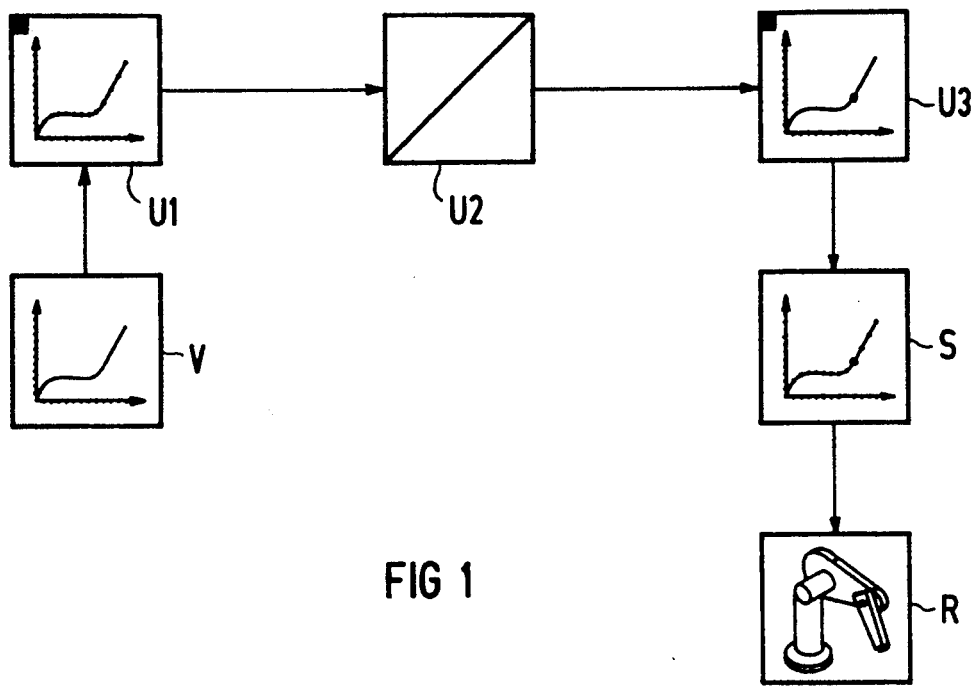
FIG. 1 shows a block diagram of a device for implementing the method according to the invention.

In FIG. 1, a robot R is shown, whose motion is supposed to be constrained to an ideal path, as indicated by a pattern V. The pattern V, whether it is a photomaster or a model, is scanned with the help of a converter U1, and the ideal path of motion is divided by this converter U1 into fine path segments using its point of origin as the first point and its target position as the last position. The fine path segments can be made equal in length in the direction of one axis. In addition, the coordinates of all the points along the ideal path of motion are stored in the converter U1. These stored coordinates are transmitted to a converter U2, which helps determine the individual spline segments according to the method of the invention. Taken together, these spline segments determine a path of motion for a robot R, and this path, which approximates the ideal path, i.e., deviates from the ideal path only within a specified tolerance with respect to the position. The relevant variables concerning the individual spline segments are stored in the converter U3 where they are available to a control system S used to control the robot R. The control system S interpolates between the successive spline segments. The output signals from the control system S then acts accordingly on the robot R.

Figure 2:
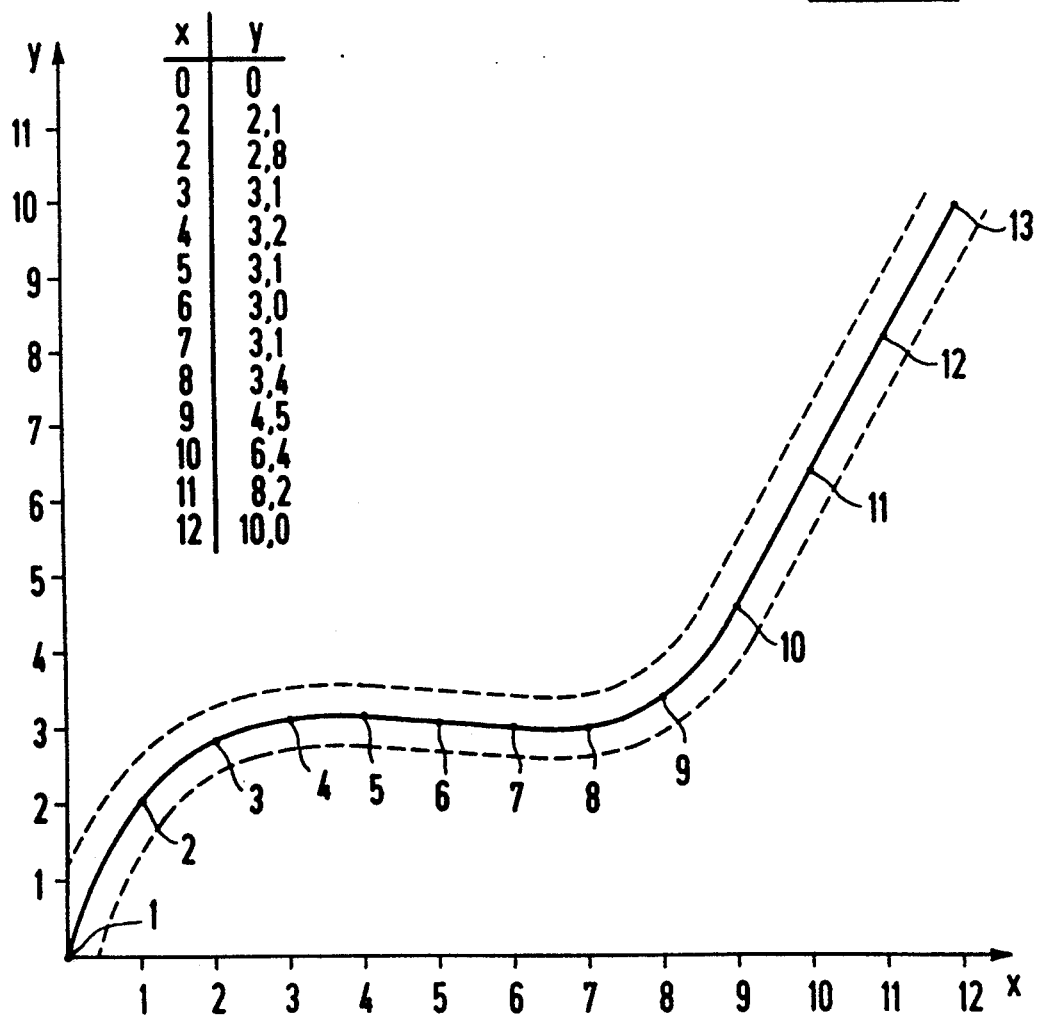
FIGS. 2 to 5 show the process steps, which begin with an ideal path of motion and lead to the approximated path of motion derived therefrom.

In FIG. 2, the curve of pattern V is shown as an ideal path in a cartesian coordinate system with the abscissa x and the ordinate y. This deal path begins at position 1 at the origin of the coordinate system and extends through positions 2 to 12 and ends at a target position 13. For the sake of clarity, it is assumed that each of the positions 1 to 13 are equidistant from each other in the abscissa direction and this distance is delta x. As a result, the method of successive spline segments described below can be clearly illustrated with the aid of the simplified Newton method.

The tolerance band around the ideal path of motion is indicated by dotted lines. The path of motion, which is made up of spline segments determined from individual third-degree polynomials, must remain within this tolerance band. The depiction of the tolerance band and the ideal path of motion in FIG. 2 is also used in FIGS. 3–5.

Using the positions 1 to 4, it is possible to find a third-degree polynomial which exactly passes through these positions 1 to 4. The values of the x and y pairs for the ideal path of motion can be taken from the table in FIG. 2. Using these values the polynomial $$y = 0.16x^3 - 1.2x^2 + 3.13x.$$

results.

All the positions 1 to 4 lie on the curve of the polynomial and thus this spline segment can be regarded as one that lies within the tolerance band. This spline segment coincides with the ideal curve to the extent that any deviations between them could not be detected from the drawing.

Figure 3:
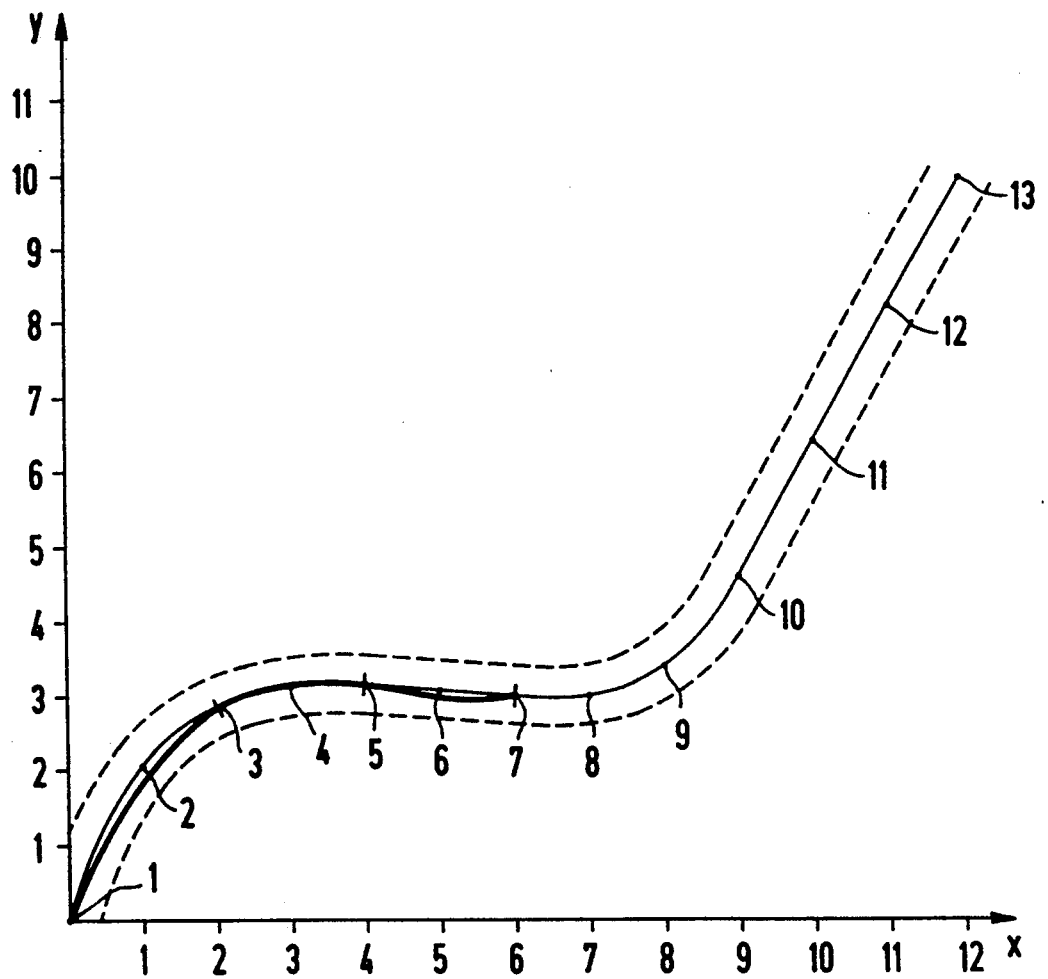

The method of the invention continues by considering a spline segment which extends beyond position 4. As shown in FIG. 3, the spline segment can extend from position 1 to position 7, which is used as a provisional end point. It is assumed that positions 1, 3, 5 and 7 are the interpolation points to be used in determining the polynomial. Taking the coordinate values of these positions on the ideal path of motion from the table in FIG. 2, the polynomial $$y = 0.0375x^3 - 0.525x^2 + 2.3x$$

results, which runs exactly through points 1, 3, 5 and 7.

The curve of this polynomial is emphasized in FIG. 3 by the heavily traced line. It can be seen that this line already exhibits clear deviations from the ideal path of motion, but it still lies within the tolerance band.

The deviation of the y-values of the polynomial from the y-values of the ideal path of motion can easily be determined. For example, the y-value of the polynomial is determined for $x = 1$, and this value is compared to the value of y at $x = 1$ of the ideal path of motion, as given in the table in FIG. 2. The difference between these y values is the distance $y_F$, which can be monitored perfectly well up to a threshold value. However, as shown in the figures, the maximum deviation is drawn around the ideal path of motion as a band of equal thickness. Consequently, it is also possible to measure the deviation of a given position as the distance between the ideal path of motion and the curve of the polynomial along the direction of a line that is perpendicular to the ideal path of motion and the tolerance band at that position.

This deviation can be determined relatively easily from solely the deviation $y_F$ and the derivative of the polynomial. For example, for the polynomial of the spline segment given above which extends to position 7, the first derivative is $y' = 0.1125x^2 - 1.05x + 2.3$. The new deviation, i.e., the deviation which is perpendicular, is then $A = y_F \cdot \text{COS}(\text{ARCTAN } y')$. At the position $x = 1$ the deviation is $A = 0.1701$.

Figure 4:
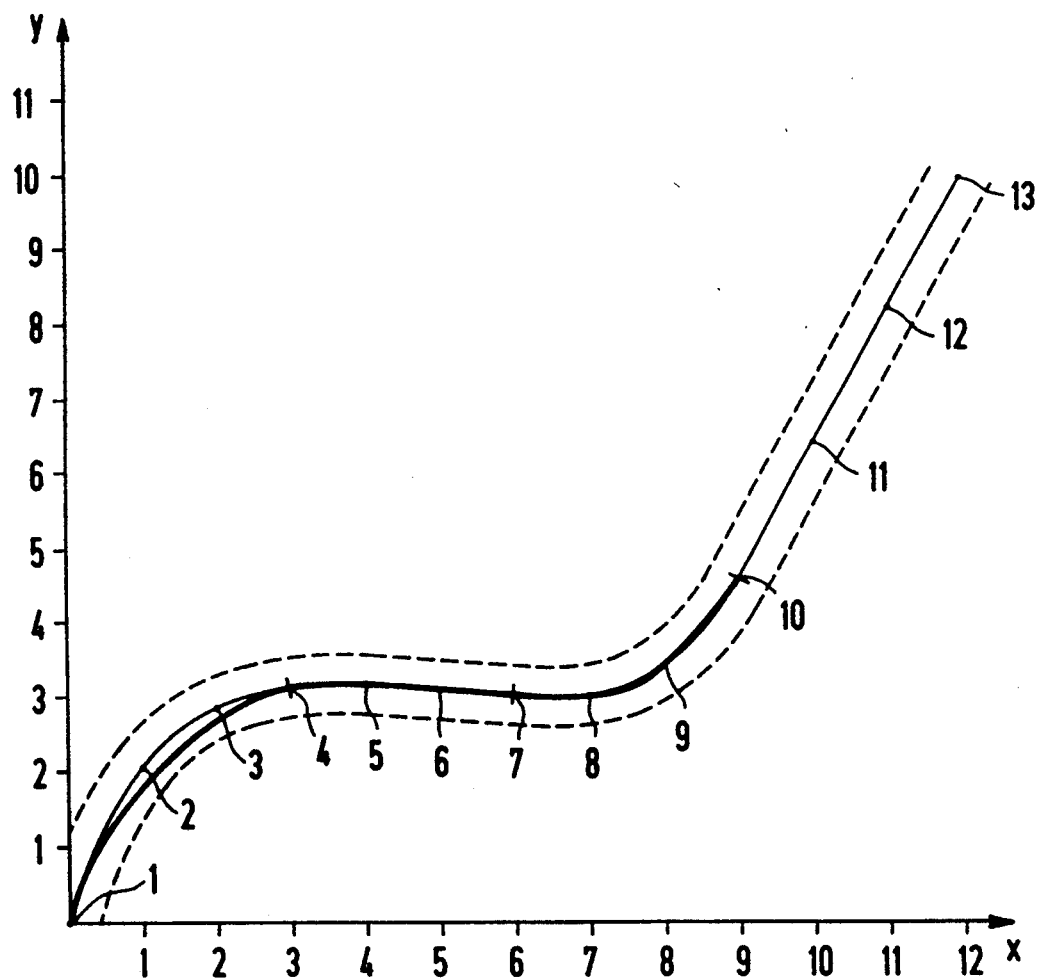

FIG. 4 shows how the curve of the appropriate polynomial would run through the positions 1, 4, 7 and 10. It is apparent from the figure that the curve of this polynomial remains within the tolerance band.

Figure 5:
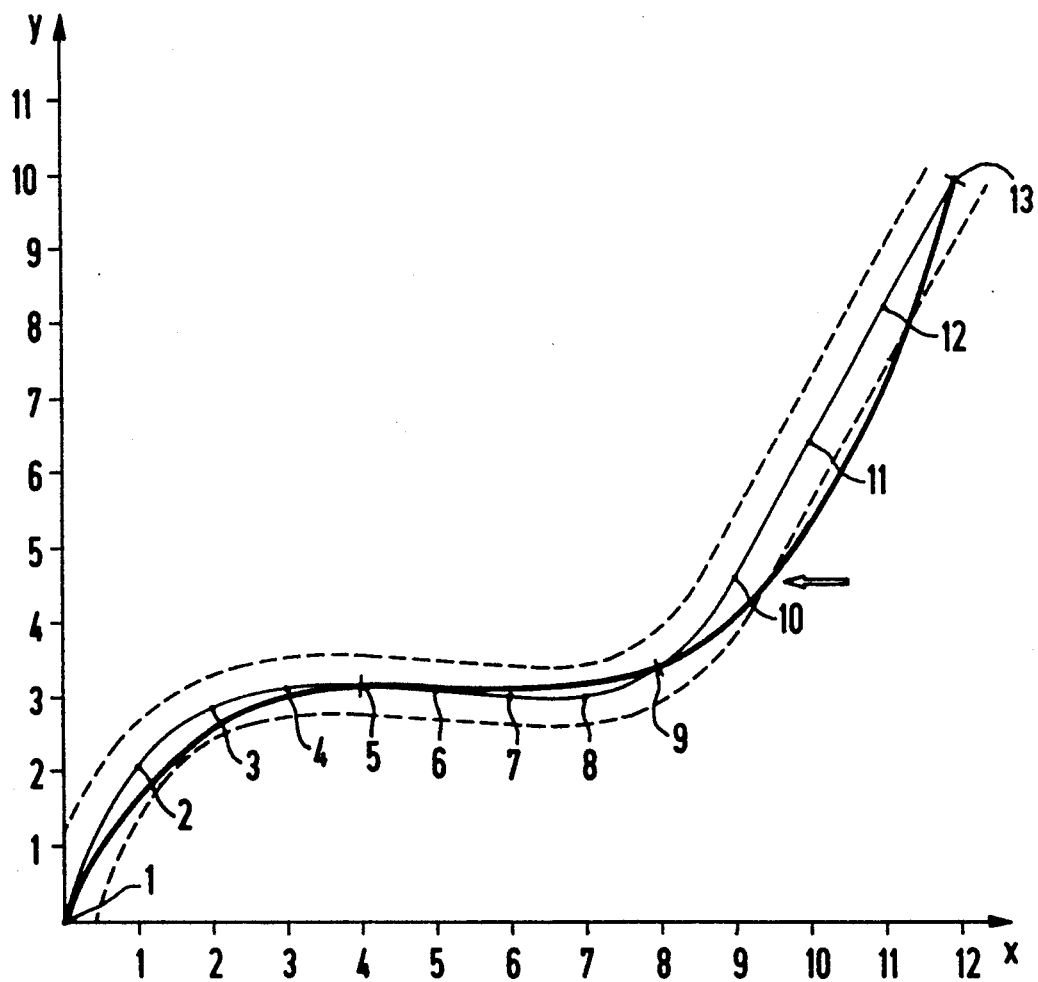

FIG. 5 shows a further extension of the spline segment by a polynomial which runs through the positions 1, 5, 9 and 13. However, the curve of this polynomial goes beyond the tolerance band, as shown in the figure by the open arrow between the positions 10 and 11. As a result, the curve of this actual spline segment is not evaluated, but rather the curve of the preceding spline segment, which is between positions 1 and 10, is used in the formation of the resulting path of motion. Accordingly, this accepted spline segment can be recorded in the control system, and the process can begin anew starting from position 10 in the manner described above.

However, such a procedure might possibly result in a small discontinuity appearing at position 10. Although the spline segment between the positions 1 and 10 is in fact sufficiently exact, it is provided according to the invention that the next spline segment is connected, not to point 10, but rather to a previous position that lies on this spline segment, for example, position 7. The process as described above would then begin anew starting from this position, which had been an interpolation point for generating its corresponding spline segment.

Instead of using the Newton method, the method of the natural spline can also be used. As with the Newton method, one first determines splines which are sufficiently accurate and which lie within the tolerance band. The subsequent splines would then start from a position on the preceding spline segment. With this method, all discontinuities can be prevented from developing on the resulting path of motion with absolute certainty. This is due to the fact that in the method of the natural splines, the parameters for the initial and the end points of the spline segment, including the slope and the curvature, are used as input data.

What is claimed is:

1. A control process for a numerically controlled machine-tool or for a robot used to determine consecutive motion segments from characteristic parameters of a plurality of consecutive positions on an ideal path of motion starting at a starting point and ending at a target position so that the motion segments can be defined by as few of the characteristic parameters as possible such that the entirety of said motion segments form a projected path of motion that approximates said ideal path of motion within a specified positional tolerance, said projected path of motion being subsequently available to be interpolated so that the machine-tool or the robot can be controlled by resulting interpolation points, said control process comprising:
   (a) dividing the ideal path of motion into fine path segments using a point of origin as a first position and the target position as a last position;
   (b) storing the characteristic parameters of all said consecutive positions on the ideal path or motion;
   (c) selecting the point of origin as the starting point of the first motion segment;
   (d) determining the parameters of a spline for a first, relatively short motion segment on the ideal path of motion said first segment ending at a location on the ideal path of motion which is used as a provisional end point;
   (e) using said characteristic parameters of at least said starting point and said provisional end point of said motion segment in determining said parameters of said spline;
   (f) determining a distance from said spline to the ideal path of motion for those positions lying between said starting point and said provisional end point;
   (g) provided that said distance does not exceed a defined limiting value, advancing said provisional end point toward the targeting position;
   (h) repeating steps (d), (e), and (f) until said limiting value is reached or exceeded, and taking the spline preceding the spline in question as said first motion segment; and
   (i) using a position on said previously accepted spline as the starting point for a new motion segment and repeating the process according to steps (d)-(g) until the target position is reached.

2. The process according to claim 1, wherein the limiting value for the distance is formed as a geometric mean of several axes defining the path of motion.

3. The process according to claim 2 further comprising presetting the limiting value for the respective distance in an axis-specific manner.

4. The process according to claim 1 further comprising presetting the limiting value for the respective distance in an axis-specific manner.

5. The process according to claim 4 wherein four position values are used as characteristic quantities for the respective spline, with which values a third-degree polynomial can be specified.

6. The process according to claim 3 wherein four position values are used as characteristic quantities for the respective spline, with which values a third-degree polynomial can be specified.

7. The process according to claim 2 wherein four position values are used as characteristic quantities for the respective spline, with which values a third-degree polynomial can be specified.

8. The process according to claim 1 wherein four position values are used as characteristic quantities for the respective spline, with which values a third-degree polynomial can be specified.

9. The process according to claim 8 wherein the splines are determined respectively by the position and slope or curvature at the specific spline end points.

10. The process according to claim 7 wherein the splines are determined respectively by the position and slope or curvature at the specific spline end points.

11. The process according to claim 6 wherein the splines are determined respectively by the position and slope or curvature at the specific spline end points.

12. The process according to claim 5 wherein the splines are determined respectively by the position and slope or curvature at the specific spline end points.

13. The process according to claim 4 wherein the splines are determined respectively by the position and slope or curvature at the specific spline end points.

14. The process according to claim 3 wherein the splines are determined respectively by the position and slope or curvature at the specific spline end points.

15. The process according to claim 2 wherein the splines are determined respectively by the position and slope or curvature at the specific spline end points.

16. The process according to claim 1 wherein the splines are determined respectively by the position and slope or curvature at the specific spline end points.

17. The process according to claim 16 and further including performing a parameterization with regard to the travelled path length.

18. The process according to claim 3 and further including performing a parameterization with regard to the travelled path length.

19. The process according to claim 2 and further including performing a parameterization with regard to the travelled path length.

20. The process according to claim 1 and further including performing a parameterization with regard to the travelled path length.

* * * * *